Oct. 4, 1927.  1,644,369
J. W. CRUIKSHANK
METHOD AND APPARATUS FOR SURFACING SHEET GLASS
Filed Dec. 14, 1923  2 Sheets-Sheet 1
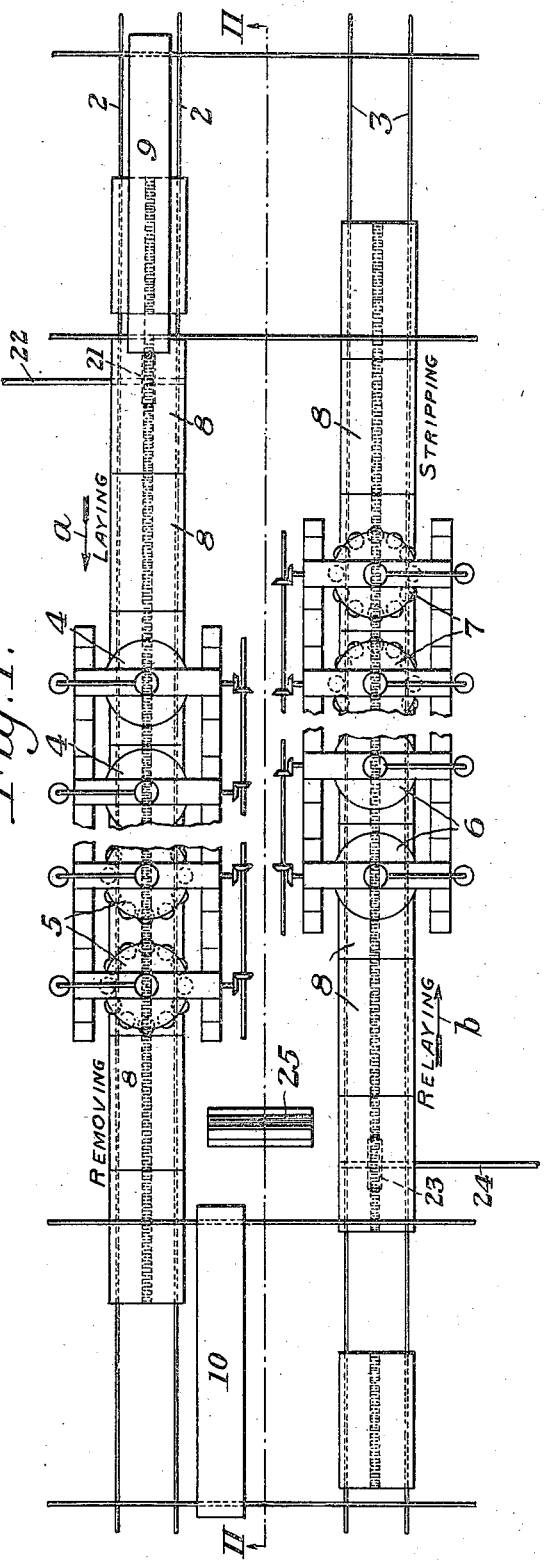
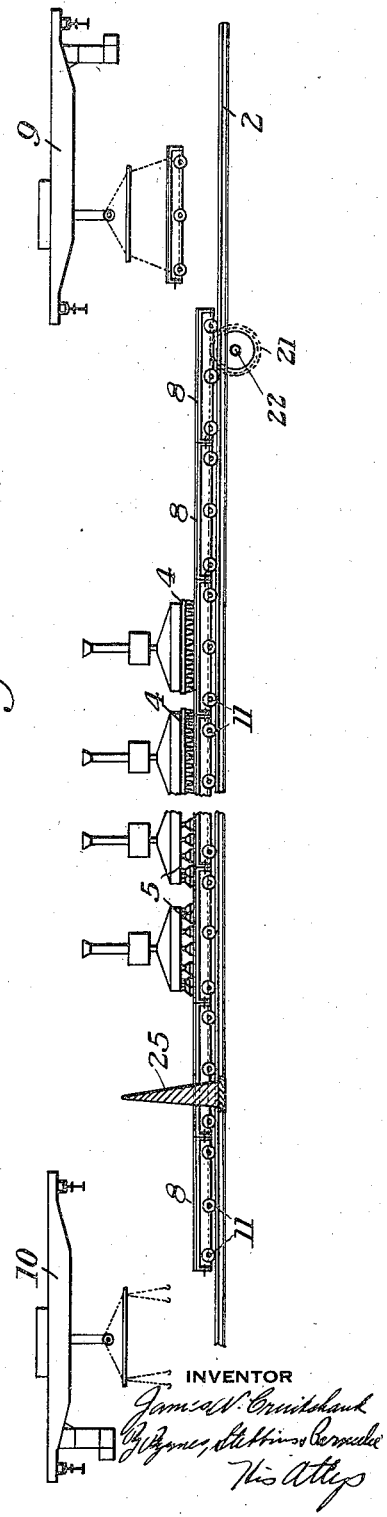
INVENTOR Oct. 4, 1927.

J. W. CRUIKSHANK 1,644,369

METHOD AND APPARATUS FOR SURFACING SHEET GLASS

Filed Dec. 14, 1923   2 Sheets-Sheet 2

INVENTOR
James W. Cruikshank
His Attys

Patented Oct. 4, 1927.

1,644,369

UNITED STATES PATENT OFFICE.

JAMES W. CRUIKSHANK, OF PITTSBURGH, PENNSYLVANIA.

METHOD AND APPARATUS FOR SURFACING SHEET GLASS.

Application filed December 14, 1923. Serial No. 680,590.

The present invention relates to the surfacing of sheet glass by the usual grinding and polishing operations and has for its object an improved method and an improved apparatus for carrying out these operations.

In the patent to Brockett No. 741,001 of October 6, 1903, there is disclosed an apparatus for surfacing sheet or plate glass comprising two parallel tracks connected at their opposite ends by transverse tracks. A series of grinders and polishers is positioned over each track and the glass to be ground is laid on rectangular tables running on said tracks. In the method disclosed in this patent each table is laid individually with glass while the table is supported on a transfer car at the laying station. The transfer car is then moved on one of the transverse tracks into line with one of parallel tracks and the table supported thereon moved off the transfer car onto the track. This table is then coupled to the series of tables on that track and moved under the grinders and polishers positioned over the track. As each table in the series of tables comes from under the last of the series of grinders and polishers at the opposite end of the track, it is uncoupled and pushed onto another transfer car on the other transverse track and is moved thereby to a position between the two parallel tracks. The glass is then turned and relaid on the table to bring the unfinished side uppermost and the transfer car moved to bring the table into line with the other parallel track, whereupon the table is pushed off onto that track and coupled to the series of tables moving under the grinders and polishers positioned over that track. As each table on the second parallel track comes from under the last of the series of grinders and polishers positioned over that track, it is uncoupled and pushed off onto the first transfer car and moved on the first transfer track to the stripping station where the finished glass is removed from the table and prepared for storing or shipping.

A serious objection to the above described method is that the glass must be laid on the table individually so that if a sheet of glass covers only a portion of the table and the next sheet is too large for the unoccupied portion of the table, the full capacity of the table cannot be utilized, because the second sheet must be placed upon another table. Furthermore, the length of the sheets to be operated upon cannot exceed the length of the tables. Another objection to this method is that the transfer of the tables from one parallel track to another by means of transverse tracks and transfer cars involves a great amount of unnecessary labor and time.

By the present invention I propose to overcome the objectionable features inherent in the method and apparatus disclosed in the above referred to patent, by the provision of an apparatus embodying parallel tracks, each having a series of grinders and polishers positioned thereover and a plurality of tables to run on said tracks and adapted to be coupled rigidly together in series so as to provide a continuous laying surface for the glass without any possibility of relative vertical movement between the tables at the joints between the same. In place of the transverse tracks at the ends of the parallel tracks and the transfer cars running thereon, I provide a crane at each end of the parallel tracks for transferring the cars from one track to the other. In accordance with my improved method, a sheet of rough glass is laid on the series of tables running on one of the tracks at a laying station adjacent one end of that track and after it passes under the series of grinders and polishers on that track, it is removed from the tables and placed on a rack, while the endmost table of the series on that track is lifted by one of the cranes and transferred to the other track, the table being turned end for end during the transfer. This table is then coupled to the series of tables on the other track and the sheet of glass placed on the rack is placed on the series of tables on the second track but with the unfinished or rough side uppermost. After this sheet has passed beneath the grinders and polishers on the second track, it is removed from the tables for storage or shipment.

My invention and its advantages will best be understood from the following description and by reference to the accompanying drawings, wherein I have illustrated a preferred embodiment of my invention.

In the drawings—

Figure 1 is a diagrammatic plan view, partly broken away, illustrating the general arrangement of the apparatus for carrying out the grinding and polishing operations.

Figure 2 is a view, partly in side elevation and partly in vertical section, of a portion of the apparatus disclosed in Figure 1, the section being taken on the line II—II of the latter figure;

Figure 3:
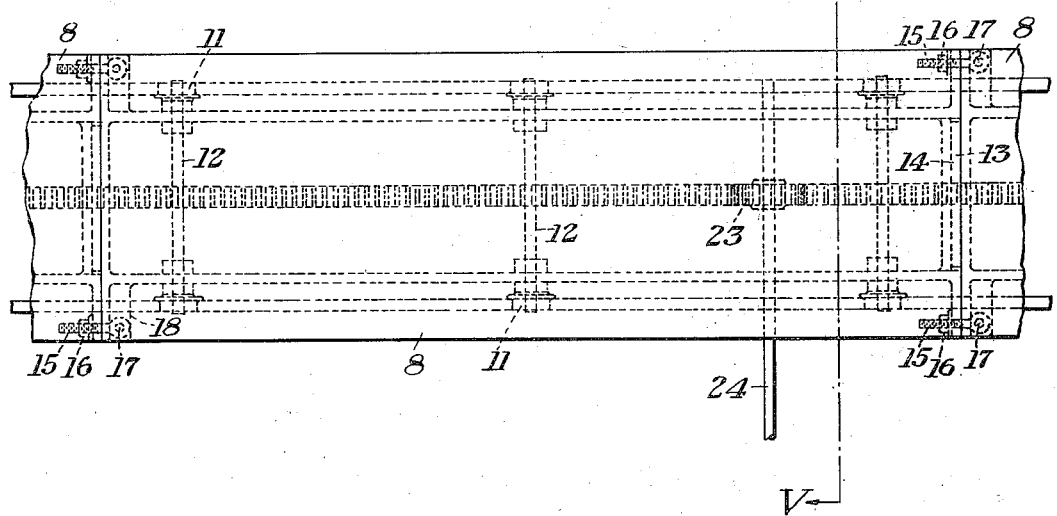
Figure 3 is a detail view on an enlarged scale of a portion of a series of coupled tables.

In the arrangement of the apparatus as disclosed in Figure 1, parallel tracks 2 and 3 are provided, the track 2 having a series of grinders 4 and polishers 5 positioned thereover and the track 3 having a similar series of grinders and polishers 6 and 7 positioned thereover. It will be noted that the grinders 6 and polishers 7 over the track 3 are arranged in the inverse order of the grinders and polishers 4 and 5 positioned over the track 2, for a purpose which will be perfectly apparent as the description proceeds.

The glass to be ground and polished is carried upon rectangular tables 8 adapted to be connected end to end and to run upon the tracks 2 and 3, the direction of movement of the tables being indicated by the arrows $a$ and $b$. The tracks should preferably be carefully milled and leveled in order that the glass may be moved evenly beneath the grinders and polishers.

Positioned adjacent opposite ends of the tracks 2 and 3 are cranes 9 and 10. The crane 9 is used for transferring the tables 8 from the track 3 to the track 2 and the crane 10 is used for transferring them from the track 2 to the track 3. During the transit of a table from one track to the other, it is swung end for end so that the forward end of each table is always coupled to the rear end of the preceding table in the series of tables on a track in the direction of motion of the tables.

Figure 4:
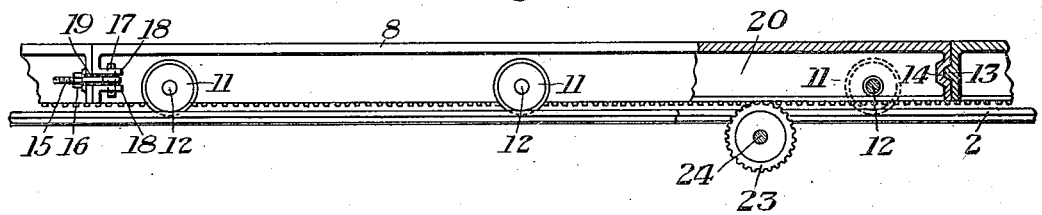
Figure 4 is a view, partly in elevation and partly in longitudinal section, of the structure shown in Figure 3.
Figure 5:
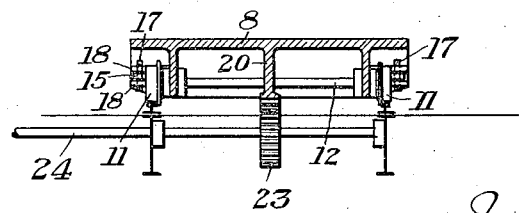
Figure 5 is a transverse sectional view on the line V—V of Figure 3.

Referring to Figures 3, 4 and 5, each rectangular table 8 is provided with a sufficient number of supporting wheels 11 to enable the table to run upon the tracks with a minimum amount of vibration. These wheels are preferably mounted upon transverse axles 12. The tables are constructed to be rigidly coupled together end to end in series in such manner as to prevent any relative vertical movement between adjacent ends of the tables and to provide a smooth continuous laying surface for the glass. To that end, one end of each table is provided with a transverse rib 13 and the other end thereof with a transverse groove 14. The rib on the end of one table in a series is adapted to be snugly received in the groove in the adjacent end of the next table in the series. At one end of each table at opposite sides thereof is provided a pair of connecting pins 15. Each pin is provided at one end thereof with an eye while the other end portion of the pin is screw-threaded to receive a nut 16. Each pin is pivoted for swinging movement in a horizontal plane upon a vertical pivot pin 17 extending through spaced lugs 18 and the eye of the pin, which is positioned between said lugs. The pins 15 at one end of a table are adapted to be swung in a horizontal plane into slots 19 formed in the adjacent end of another table. When swung into this position, the nuts 16 may be tightened up to securely clamp the two tables together. Preferably the connecting pins 15 will be positioned in the plane of the ribs and grooves 13 and 14, the said ribs and grooves being terminated short of the sides of the table for this purpose.

Each table is provided on the under side thereof with a depending longitudinally extending central flange or web 20 co-extensive in length with the table and provided on its lower edge with rack teeth. Positioned in a pit beneath the track 2 adjacent the forward end thereof is a pinion 21 mounted on a shaft 22. This shaft is adapted to be driven by any suitable means, such as a motor. A similar pinion 23 is positioned in a pit beneath the track 3 adjacent the rear end thereof, the said pinion being mounted upon a shaft 24, also driven by any suitable means, such as a motor. Obviously these pinions are provided for engaging the racks on the tables for driving the same.

The method of carrying out the grinding and polishing operations with the apparatus above described is substantially as follows: Let it be assumed that there is a series of coupled tables on the track 2 moving in the direction of the arrow $a$ and another series of tables on the track 3 moving in the direction of the arrow $b$. It may be further assumed that the series of tables on each track is laid with glass substantially throughout the length of such series of tables, but that there is a space for glass to be laid on the tables on track 2 at the laying station indicated in Figure 1. A sheet of rough glass of the width of the tables, or sheets that will aggregate their width, is laid on the tables at said laying station in juxtaposition to the preceding sheets. It is not necessary that the sheet or sheets so laid be the exact length of a table 8, for, by reason of the continuity of laying surface as previously described, the sheet or sheets laid on the moving tables at the laying station may be so placed as to overlie the joint between two tables. As the tables laid with glass move along on track 2 and allow room, an empty table is transferred from track 3 by means of the crane 9 to the track 2. By reference to Figure 2 it will be seen that the crane 9 is carrying such an empty table. This table is turned end for end before being placed on the track 2 and when so placed is pushed into engagement with the end table on that track and coupled to said end table. The connected series of tables on track 2 is propelled along slowly on this track to carry the sheets of glass thereon beneath the grinders and polishers 4 and 5 which operate to grind and polish one side of the sheets. At the removing station indicated in Figure 1, the glass on the endmost table of the series of tables moving on track 2 is removed and placed on a rack 25 positioned between the tracks 2 and 3. This rack may be of the usual A form. The empty table is then transferred from the track 2 by means of the crane 10 to the track 3 and is moved thereon into engagement with the endmost table of the moving series of tables on the latter track and coupled to said endmost table. The glass which has been removed from said table and placed on the rack 25 is then taken from said rack and relaid on the table at the relaying station indicated in Figure 1 so as to bring the unfinished side of the glass uppermost. The connected series of tables on track 3 is propelled along this track to carry the sheets of glass thereon beneath the grinders and polishers 6 and 7 which operate on the other side of the sheets to grind and polish them. At the stripping station indicated in Figure 1 the finished glass is removed from the tables on track 3 and prepared for storage or shipment. As previously explained, the tables from which the glass is removed at the stripping station is disconnected and transferred, one at a time, by the crane 9 to track 2, where the operation of laying the rough glass is carried out, as previously described.

The advantages of the invention will be apparent from the foregoing description. By the provision of a series of moving tables on each of the parallel tracks so constructed and connected as to provide a continuous laying surface for the glass, the total laying surface of the tables may be utilized to the fullest extent. Furthermore, the length of the sheets of glass to be operated upon does not have to be limited to the length of an individual table. By the elimination of transverse tracks and transfer cars, or similar devices, and the substitution of cranes for transferring the empty tables from one track to the other, the speed of operation is greatly increased and the amount of labor necessary for carrying out the surfacing operations greatly reduced. Furthermore, in glass factories the saving of any space is desirable, so that the elimination of the transverse tracks and transfer cars has this advantage also.

While I have disclosed a preferred embodiment of my invention, it will be understood that changes may be made in the construction and operation disclosed within the scope of the appended claims. Furthermore, the term "surfacing" used in the specification and claims is intended to cover not only grinding and polishing but any other similar operations for giving the glass the desired surface, such as "smoothing."

I claim:

1. The method of surfacing sheet glass by the continuous process wherein a series of table sections are continuously propelled beneath surfacing elements, which consists in first rigidly coupling empty table sections together to prevent relative movement thereof and to form a continuous glass receiving surface composed of a number of tables, then laying glass to be surfaced on this receiving surface irrespective of the location of the glass with reference to the joints between table sections, and then passing the rigidly connected table sections under the surfacing elements.

2. In the surfacing of glass, the method which consists in progressively adding and rigidly connecting rolling sections to one end of a rigid sectional grinding table providing a certain extent of continuous glass receiving surface unbroken where the sections meet, moving the table forward under surfacing units, disconnecting the sections from the forward end of the rigid sectional table after they have passed the grinding units, and laying the glass on the rear portion of the rigid sectional table as the sections are added in such manner that the glass will overlap the joints between sections at least some of the time.

3. Apparatus for surfacing sheet glass, comprising a track, surfacing means positioned thereover, a certain extent of continuous glass receiving surface formed of a plurality of rolling tables adapted to run on said track and having provision for rigidly coupling the same together in series, comprising means for interlocking the sections against any relative vertical or lateral movement and for holding them against longitudinal separation so as to prevent any relative movement between the tables at the joint, to form a continuous laying surface, and means for propelling said tables on said track, substantially as described.

In testimony whereof I have hereunto set my hand.

JAMES W. CRUIKSHANK.